United States Patent [19]

Kobayashi

[11] Patent Number: 5,109,902

[45] Date of Patent: May 5, 1992

[54] PNEUMATIC TIRES INCLUDING A FOAMED TREAD BASE RUBBER

[75] Inventor: Kazuomi Kobayashi, Kodaira City, Japan

[73] Assignee: Bridgestone Corporation, Tokyo, Japan

[21] Appl. No.: 440,543

[22] Filed: Nov. 22, 1989

[30] Foreign Application Priority Data

Nov. 22, 1988 [JP] Japan .................................. 63-295473
May 2, 1989 [JP] Japan .................................. 1-112994

[51] Int. Cl.$^5$ .............................................. B60C 11/00
[52] U.S. Cl. .................................. 152/209 R; 152/532
[58] Field of Search ............ 152/209 R, 209 B, 209 A, 152/526, 532, 537

[56] References Cited

U.S. PATENT DOCUMENTS 2,445,725  7/1948  Walker ............................. 152/209 R
4,319,619  3/1980  Kozima et al.
4,381,810  5/1981  Cady et al.
4,838,330  6/1989  Takayama ......................... 152/209 R

FOREIGN PATENT DOCUMENTS

1016583   9/1957  Fed. Rep. of Germany.
3042350   5/1982  Fed. Rep. of Germany.
2302874   1/1976  France.
 283001  12/1987  Japan ............................. 152/209 R
63-93604   4/1988  Japan.
2044191  10/1980  United Kingdom.

*Primary Examiner*—Geoffrey L. Knable
*Attorney, Agent, or Firm*—Sughrue, Mion, Zinn, Macpeak & Seas

[57] ABSTRACT

A pneumatic tire comprising a toroidal carcass, a belt composed of at least two rubberized cord layers arranged radially outside the carcass, and a tread surrounding the periphery of the belt. The tread rubber comprises a base rubber made of a foamed rubber, and a cap rubber made of a non-foam rubber. The cap rubber is arranged radially outside the base rubber.

1 Claim, 8 Drawing Sheets

FIG. 1

FIG_2

FIG_3

FIG_6

FIG_7

PNEUMATIC TIRES INCLUDING A FOAMED TREAD BASE RUBBER

BACKGROUND OF THE INVENTION

1. Field of the Invention

The present invention relates to pneumatic tires having an improved tread structure.

2. Related Art Statement

For example, pneumatic tires as described in Japanese patent application Laid-open No. 63-93,604 are formerly known, in which their tread structure is improved. Such tires are pneumatic tires having a cap/base structure in which a tread is constituted by an outer tread portion which is arranged on a radially outer side of the tire and made of a single kind of a rubber and an inner tread portion which is arranged radially inside a surface of a wearing indicator of the tread and also on a radially inner side of the tire and made of plural kinds of rubbers. The inner tread portion is divided into at least three zones in an axial direction of the tire, that is, a central zone spread over tire equator and side zones continuously positioned on the opposite sides of the central zone. The hardness of the tread rubber in the central zone of the inner tread portion is made smaller than that of the tread rubber in the side zones and that of the tread rubber in the outer tread portion, and hardness of the tread rubber in the inner tread portion is increased as it goes from the central zone to the side zones. Further, hardness of the tread rubber of that portion of the inner tread which is located on the axially outermost portion of the tire is not greater than that of the tread rubber in the outer tread portion. When the hardness of the rubber of the tread is decreased as it goes to the radially inner side and to the axially inner side in the above manner, anti-vibration riding comfortability can be improved without deteriorating wear resistance.

The tread rubber, that is, the rubber of the inner and outer tread portions is all made of a non-foam rubber in the above-mentioned tire. When compression forces are applied to such a non-foam rubber, its volume is not almost reduced. Thus, even when the hardness of the rubber of a part of the tread, that is, the inner tread portion, is decreased as mentioned above, a compression modulus of the entire tread does not almost decrease in actuality. As a result, anti-vibration riding comfortability can merely be improved to some extent, but no sufficient effect cannot be obtained during actual use. In addition, the tensile modulus of an ordinary non-foam rubber is reduced corresponding to reduction in the rubber hardness as mentioned above.

SUMMARY OF THE INVENTION

It is an object of the present invention to provide pneumatic tires of which anti-vibration riding comfortability can greatly be improved without deteriorating wear resistance.

The above-mentioned object can be accomplished by a pneumatic tire comprising a toroidal carcass, a belt arranged radially outside the carcass and consisting of at least two rubberized cord layers, a tread rubber surrounding the belt, wherein the tread rubber is constituted by a base rubber made of a foamed rubber and a cap rubber made of a non-foam rubber and arranged radially outside the base rubber.

In the above described tire, it is preferable that the widthwise center of the base rubber is almost in conformity with the equatorial plane of the tire and that the width of the base rubber is narrower than that of the belt so that the cap rubber may be laid on widthwise opposite sides of the base rubber. Further, the expansion ratio (Vs) of the base rubber is preferably in a range from 10% to 50%. The ratio b/W in which b and W are the width of the base rubber and the width of the ground contact area of the tread, respectively, preferably falls in a range from 0.15 to 0.65. Further, the ratio t/T in which t and T are the maximum gauge of the base rubber and that of the tread rubber, respectively, falls in a range from 0.05 to 0.50.

The tread rubber of the pneumatic tire according to the present invention involves the base rubber made of foamed rubber. When compression forces are applied to such a foamed rubber, bubbles inside the rubber are collapsed to decrease the volume by compression. Consequently, its compression modulus becomes smaller as compared with that of a non-foam rubber. Thus, as compared with the tire in which the entire tread is constituted by the non-foam rubber, the rigidity of the above tread rubber against the compression forces becomes lower. When such a pneumatic tire is run, compression forces act upon the tread rubber at the ground contacting area due to loading, and vibrations are applied to the tire owing to the uneven ground surface. These vibrations are effectively attenuated with the base rubber having the volume reduced by compression under application of compression stresses, so that anti-vibration riding comfortability is greatly improved. On the other hand, since the cap rubber, arranged radially outside the base rubber, is made of the non-foam rubber, wear resistance will not lower. In this way, according to the present invention, anti-vibration riding comfortability can greatly be improved without deteriorating wear resistance.

Further, when the cap rubber is arranged not only radially outside the base rubber but also on the widthwise opposite sides thereof, rigidity of the opposite shoulder portions of the pneumatic tire and bending rigidity of the tread rubber are maintained at respective levels as conventionally possessed, while cornering stability is prevented from lowering. At the same time, the foamed rubber having a higher wearing rate, that is, the base rubber is protected against wearing. Further, when the expansion ratio (Vs), the ratio b/W and the gauge ratio t/T fall within the above-specified respective ranges, anti-vibration riding comfortability and cornering stability can both be improved as compared with conventional tires, and drop in entire wearing life can be prevented.

These and other objects, features, and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

The first embodiment according to the present invention will now be explained with reference to the drawings.

Figure 1:
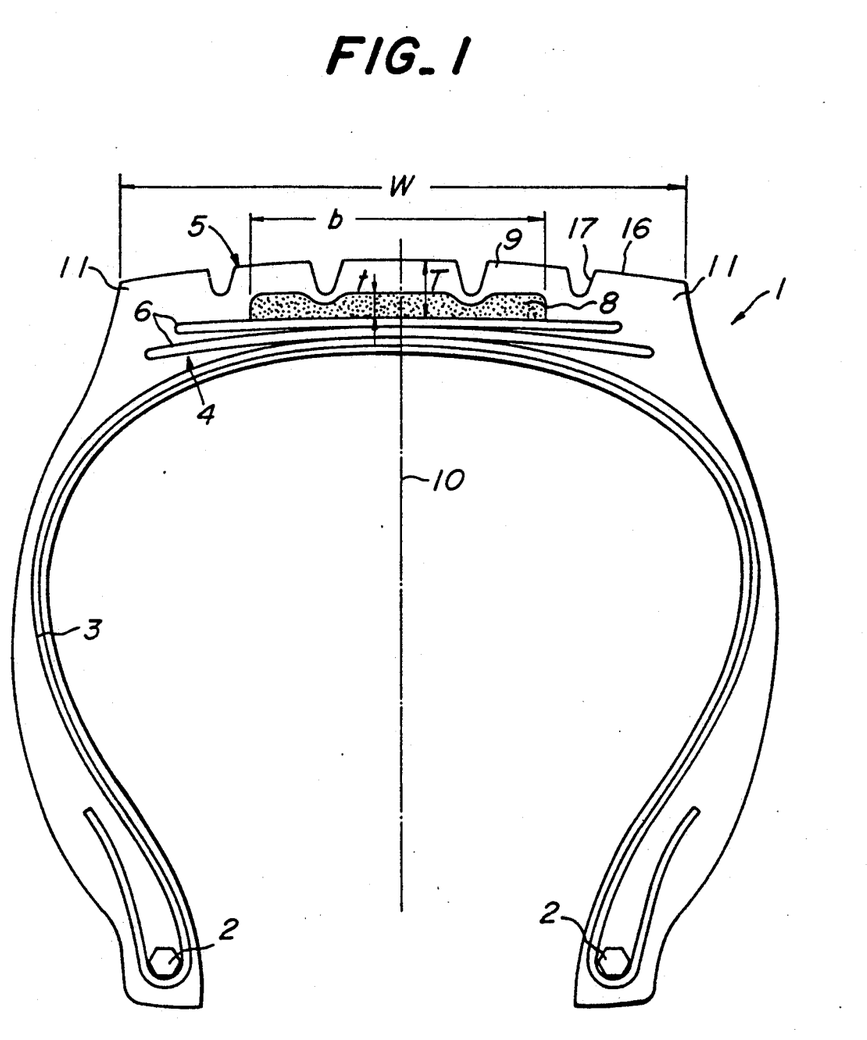
FIG. 1 is a sectional view of a first embodiment according to the present invention taken along a meridian line.

In FIG. 1, a reference numeral 1 is a pneumatic tire. The tire comprises a toroidal carcass 3 having axially opposite end portions turned up around beads 2, a belt 4 radially outwardly arranged on the carcass 3, and a tread rubber 5 surrounding the belt 4. The belt 4 is constituted by piling at least two rubberized cord layers 6 one upon another. The tread rubber 5 is constituted by a base rubber 8 arranged on a radially inner side of the tire and made of a foamed rubber containing numerous closed cells, and a cap rubber 9 arranged on a radially outer side of the tire and made of a non-foam rubber. When compression forces act upon the foamed rubber constituting the base rubber 8, the closed cells inside the foamed rubber are collapsed to reduce their volume. Accordingly, compression modulus of the foamed rubber is smaller than that of the non-foam rubber constituting the cap rubber 9. Further, the base rubber 8 so arranged that its widthwise center may be almost in conformity with the equatorial plane 10 of the tire. The width b of the base rubber is smaller than that of the belt 4. By so constructing, the cap rubber 9 made of the above non-foam rubber is arranged radially outside and on widthwise opposite sides of the base rubber 8. As a result, the outer and opposite sides of the base rubber 8 are surrounded with the cap rubber, so that cornering stability can be prevented from lowering, while rigidity of opposite shoulder portions 11 of the tire 1 and bending rigidity of the tread rubber 5 are maintained at same levels as those of the tire in which the tread rubber is entirely made of the unfoamable rubber. At the same time, the foamed rubber having a higher wearing rate, that is, the base rubber 8 is protected against wearing. Further, it is preferable that the ratio b/W falls in a range from 0.15 to 0.65, in which b and W are the width of the base rubber 8 and the ground contact width of the tread when a normal internal pressure is applied to the tire 1 fitted to a normal rim under application of a normal load, respectively. The reason is that if the ratio b/W is less than 0.15, anti-vibration riding comfortability is lowered than the conventional tires as mentioned later. On the other hand, if the ratio is more than 0.65, the cornering stability is lowered as compared with the conventional tires. In addition, it is preferable that the expansion ratio (Vs) of the base rubber 8 falls in the range from 10 to 50%. The reason is that if the expansion ratio is less than 10%, the anti-vibration riding comfortability is lowered than the conventional tires as mentioned later. On the other hand, if the expansion ratio is more than 50%, the cornering stability is lowered than that of the conventional tires and the complete wear life is rapidly lowered.

Usually, the expansion ratio (Vs) is represented by the following equation.

$$Vs = \{(p_0 - p_g)/(p_1 - p_g) - 1\} \times 100 (\%) \qquad (1),$$

wherein:

$p_1$ is the density (g/cm$^3$) of the foamed rubber;

$p_0$ is the density (g/cm$^3$) of a solid part of the foamed rubber; and $p_g$ is the density (g/cm$^3$) of a gas contained in the foams of the foamed rubber.

Because the value of $p_g$ is negligibly small as compared with that of $p_1$, the above-carried equation "(1)" can be replaced with the following equation.

$$Vs = (p_0/p_1 - 1) \times 100 \qquad (2)$$

Further, it is preferable that the gauge ratio t/T falls in the range from 0.05 to 0.50, where t and T are the maximum gauge of the base rubber 8 and that of the tread rubber 5, respectively. The reason is that if the gauge ratio t/T is less than 0.05, the anti-vibration riding comfortability is lowered than the conventional tires as mentioned later. On the other hand, if the gauge ratio is more than 0.50, the base rubber 8, which has a greater wearing rate, comes out from the surface of the tire at the wear final stage to rapidly lower the complete wear life, and to lower the cornering stability than the conventional tires. If a deep main groove 17 is formed in the surface portion 16 of the tread of the tire 1, the base rubber 8 may appear at the groove bottom of the main groove 17. The base rubber 8 made of the foamed rubber is weaker than the non-foam rubber, and is easily broken.

Therefore, the base rubber must not come out from the groove bottom of the main groove 17. In the above embodiment, those portions of the base rubber which overlap with the main grooves 17 are dented toward the radially inner side of the tire.

When the above tire 1 is fitted to a vehicle and the vehicle is run under rotation of the tire 1, compression forces act upon the tread rubber 5 within the ground contact area owing to a load, and vibrations are inputted to the tire due to the uneven ground surface. Since the foamed rubber of which the compression modulus is reduced to about ½ of the non-foam rubber is used for the base rubber 8 of the tire 1 in this embodiment, vibrations inputted are absorbed and attenuated to a large extent by the base rubber 8 capable of effectively reducing its volume under application of the compression stresses, so that the anti-vibration riding comfortabilty of the vehicle can greatly be improved. On the other hand, since the cap rubber 9 arranged radially outside the base rubber 8 is made of the non-foam rubber having a small wearing rate, wear resistance will not drop.

Next, a first test example will be explained.

Test Example 1

Figure 2:
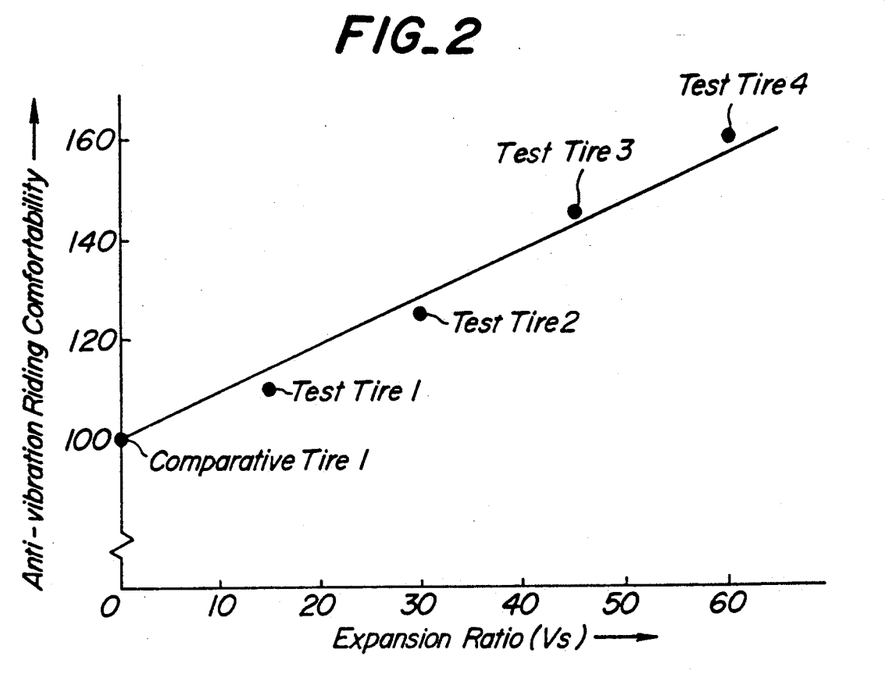
FIG. 2 is a graph showing results in a first Test Example, that is, changes in anti-vibration riding comfortability with respect to the expansion ratio.
Figure 3:
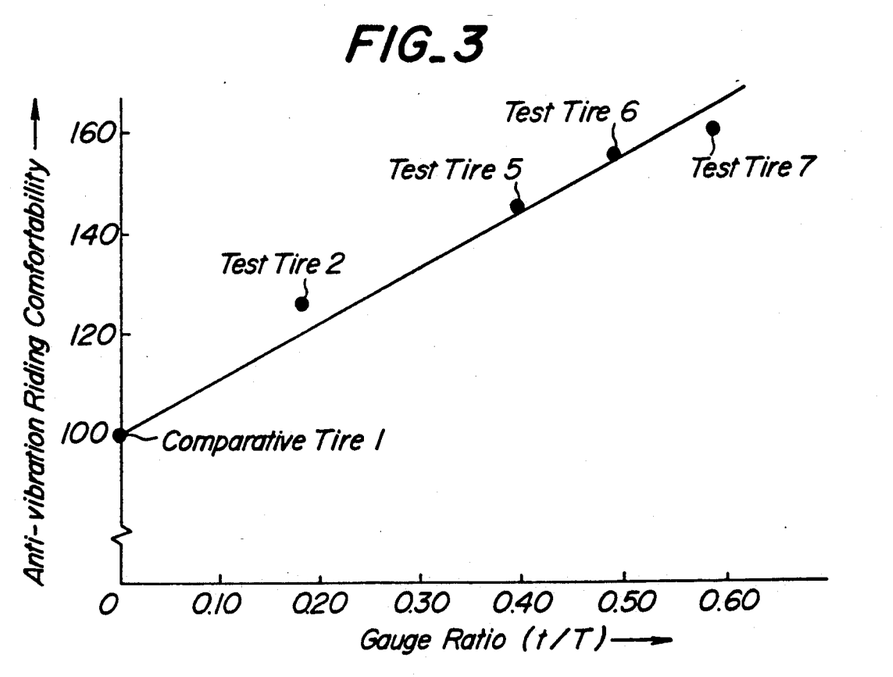
FIG. 3 is a graph showing other results in the first Test Example, that is, changes in the anti-vibration riding comfortability with respect to the gauge ratio t/T.
Figure 4:
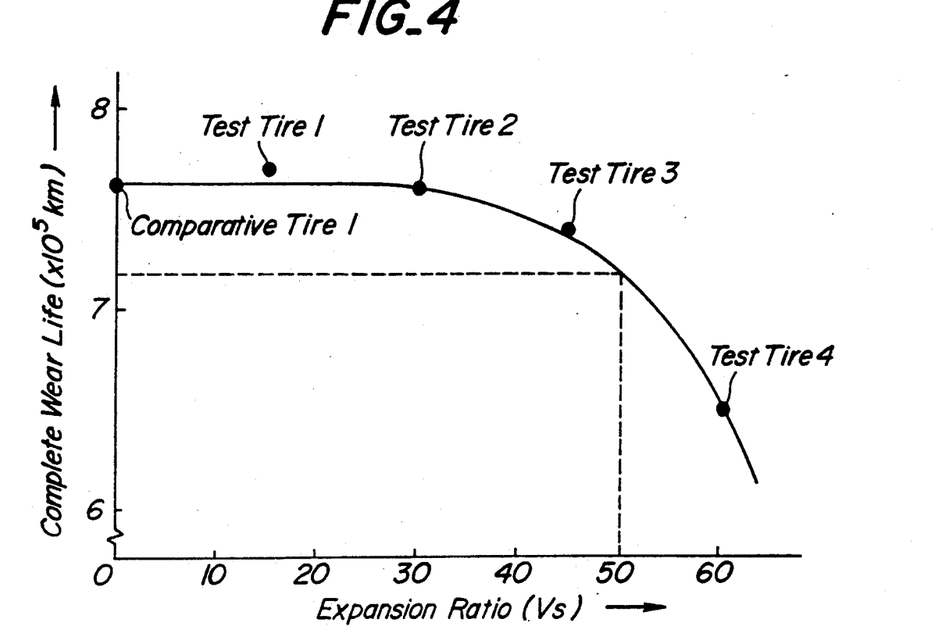
FIG. 4 is a graph showing still other results in the first Test Example, that is, changes in the complete wear life with respect to the expansion ratio.
Figure 5:
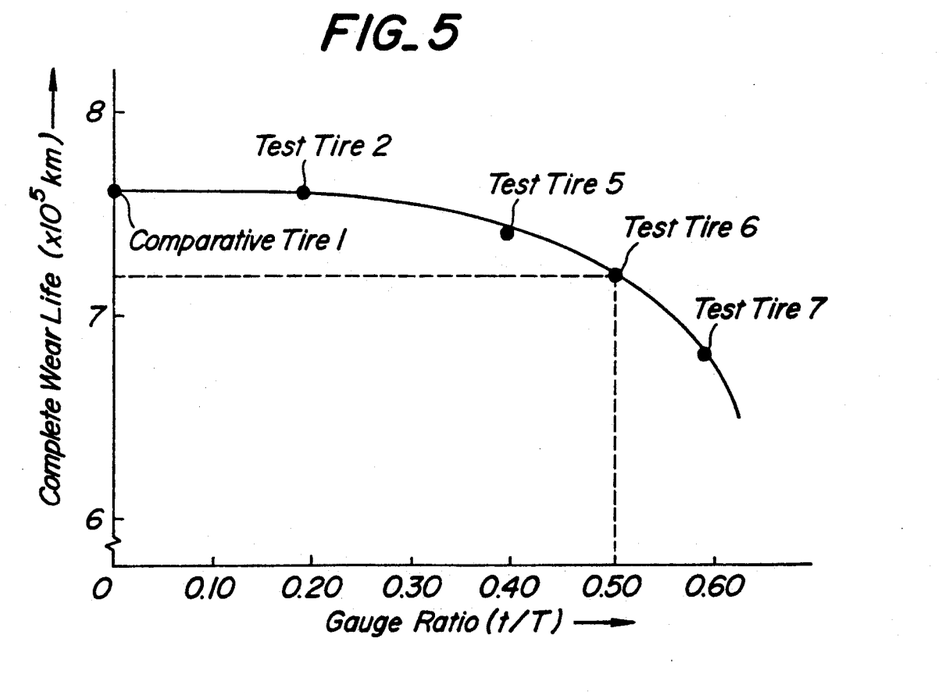
FIG. 5 is a graph showing further results in the first Test Example, that is, changes in the complete wear life with respect to the gauge ratio t/T.

On conducting this test, Comparative Tire 1 in which a tread rubber was entirely made of a non-foam rubber, and Test Tires 1 through 7 to which the present invention was applied were prepared. Various dimensions of each of the tires are shown in Table 1, and their tire size was 185/70SR14. Next, each of the tires was fitted to a vehicle, its anti-vibration riding comfortability was evaluated by driver's feeling. Results are shown in Table 1 by index. As is clear from Table 1, the anti-vibration riding comfortability was improved for the Test Tires. As shown in FIGS. 2 and 3, as the expansion ratio (Vs) increases or as the gauge ratio t/T increases, the anti-vibration riding comfortability is improved. Further, the complete wear life was measured by running each of the tires in this test. The complete wear life means a running distance at which at least one portion of the remaining main groove became 1.0 mm or less in depth. The main groove means the deepest groove in the tread, and is generally a wide groove extending continuously in a circumferential direction. Results are shown in FIGS. 4 and 5. From the results, it is seen that as the expansion ratio (Vs) increases or as the gauge ratio t/T increases, the complete wear life lowers. If the expansion ratio (Vs) exceeds 50% or if the gauge ratio t/T exceeds 0.5, the complete wear life rapidly drops. Thus, it is preferable that the expansion ratio (Vs) is not more than 50% and that the gauge ratio t/T is not more than 0.50.

TEST EXAMPLE 2

Figure 6:
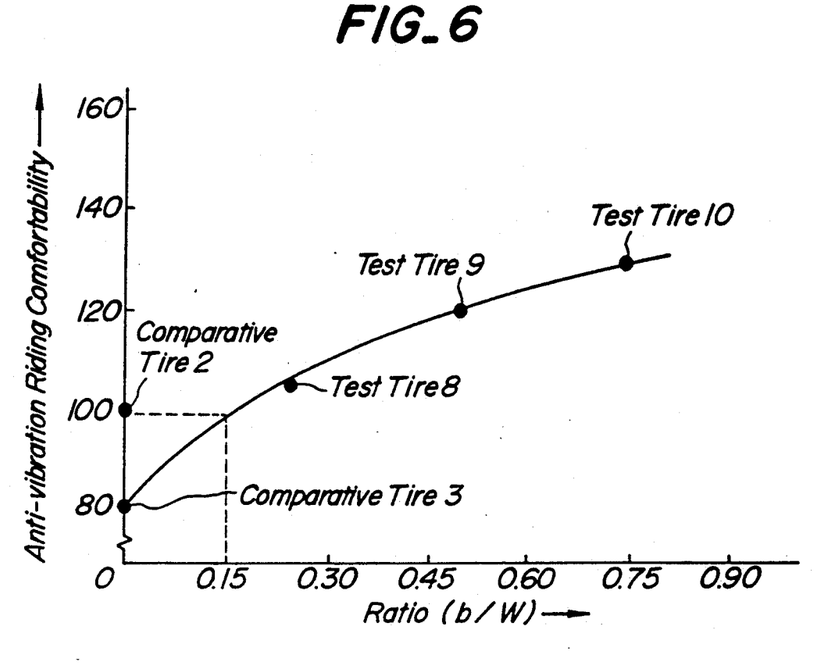
FIG. 6 is a graph showing results in a second Test Example, that is, changes in the anti-vibration riding comfortability with respect to the ratio b/W.
Figure 7:
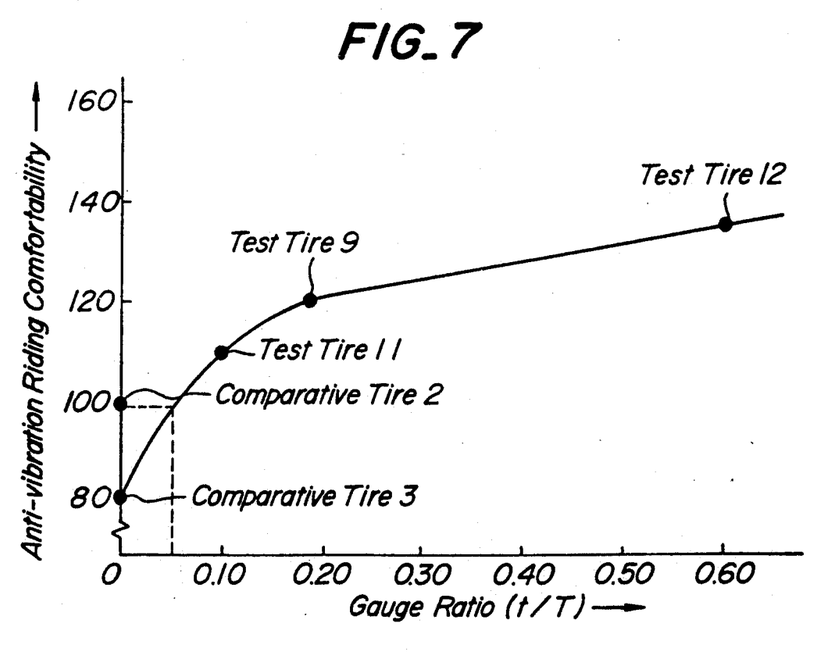
FIG. 7 is a graph showing other results in the second Test Example, that is, changes in the anti-vibration riding comfortability with respect to the gauge ratio t/T.
Figure 8:
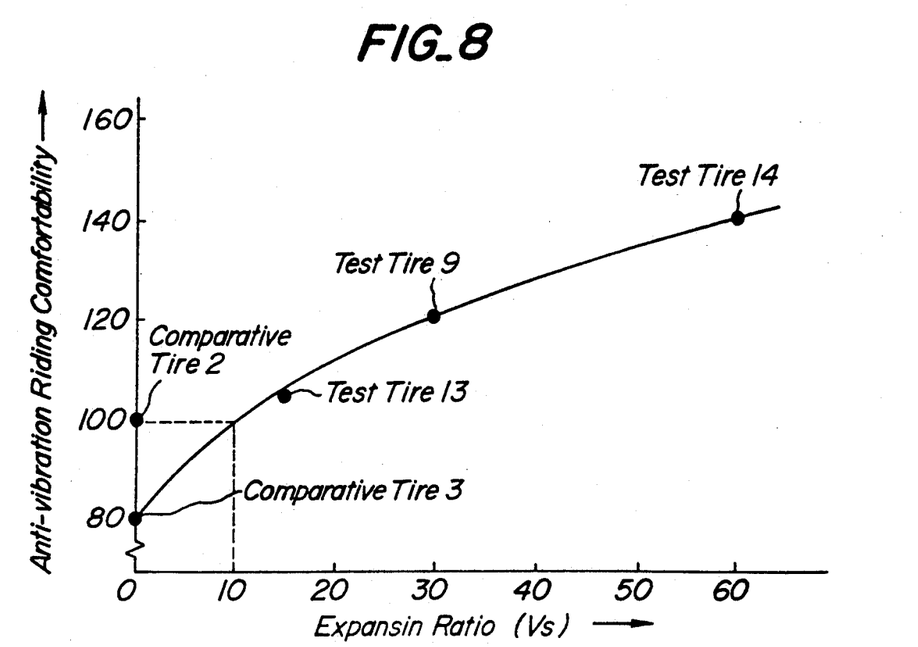
FIG. 8 is a graph showing still other results in the second Test Example, that is, changes in the anti-vibration riding comfortability with respect to the expansion ratio.
Figure 9:
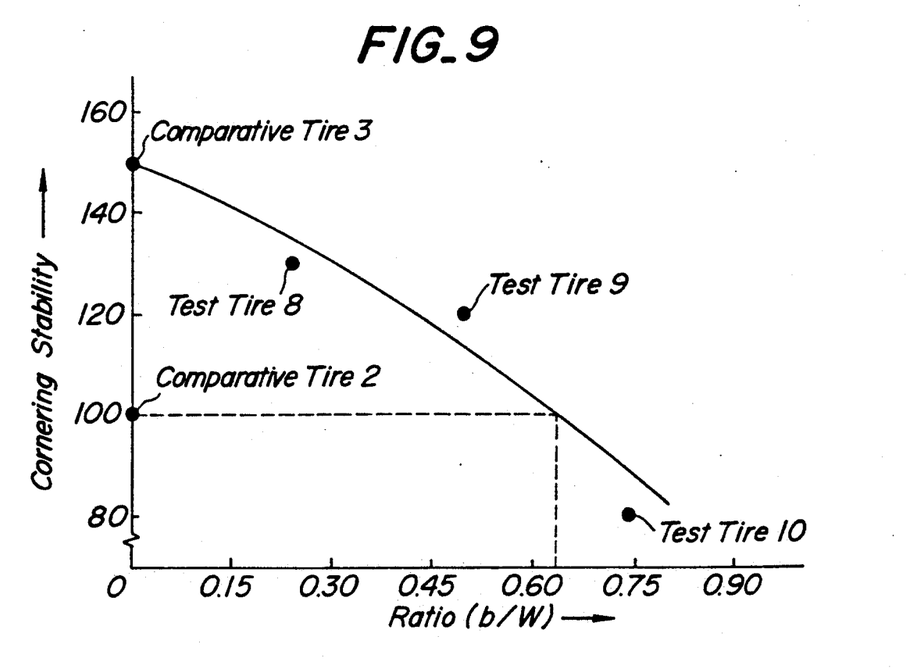
FIG. 9 is a graph showing further results in the second Test Example, that is, changes in the cornering stability with respect to the ratio b/W.
Figure 10:
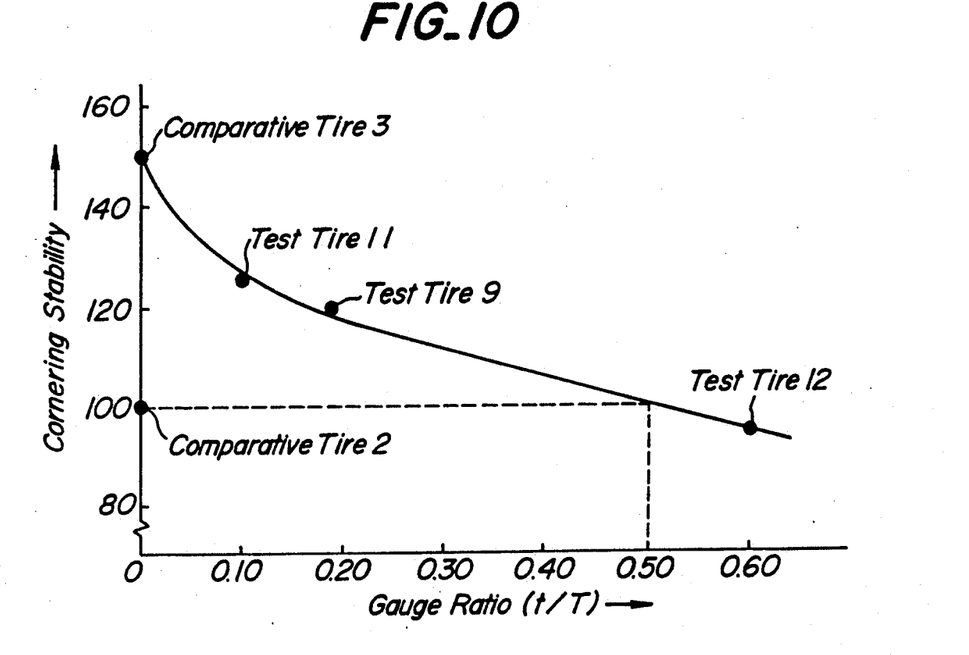
FIG. 10 is a graph showing still further results in the second Test Example, that is, changes in the cornering stability with respect to the gauge ratio t/T.
Figure 11:
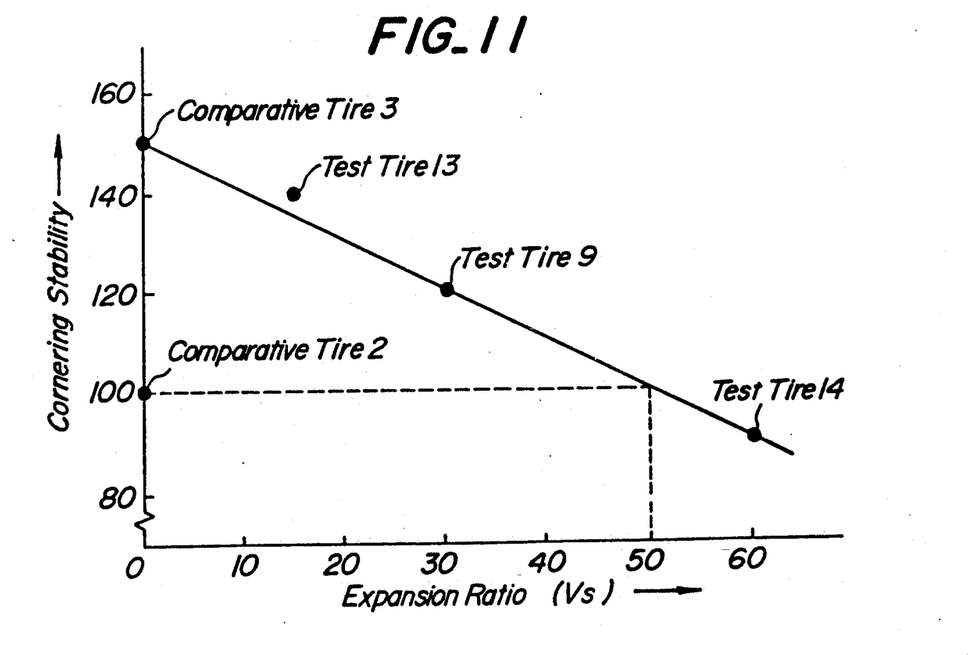
FIG. 11 is a graph showing results in the second Test Example, that is, changes in the cornering stability with respect to the expansion ratio.

On conducting the second test example, Comparative Tires 2 and 3 in which a tread rubber was entirely made of a non-foam rubber and Test tires 8 through 14 to which the present invention was applied were prepared. Comparative Tire 2 is a tire in which contradictory properties, that is, the anti-vibration riding comfortability and the cornering stability were both satisfied by selecting an appropriate kind of a non-foam rubber. Thus, Comparative tire 2 had a practically sufficient anti-vibration riding comfortability and cornering stability. The tire size of each of the tires used in this Test Example was 185/70R14, and the ground contact width of the tread was 121 mm. Various dimensions of the tires are shown in Table 2. Next, each of the tires was fitted to the passenger car vehicle, and the vehicle was run on a test course. The anti-vibration riding comfortability and the cornering stability were evaluated by the driver's feeling. Results are shown in Table 2 and FIGS. 6 to 11. As is seen from Test Example 2, and FIGS. 6, 7 and 8, as the ratio b/W increases, or as the gauge ratio t/T increases, or as the expansion ratio (Vs) increases, the anti-vibration riding comfortability is improved. However, is the ratio b/W is less than 0.15, or if the gauge ratio t/T is less than 0.15, or if the expansion ratio (Vs) is less than 10%, the anti-vibration-riding comfortability is lowered than the above Comparative Tire 2. Therefore, it is preferable that the ratio b/W is not less than 0.15, that the gauge ratio t/T is not less than 0.55, and that the expansion ratio (Vs) is not less than 10%. On the other hand, as is clear from Table 2, and FIGS. 9, 10 and 11, as the ratio b/W increases, or as the gauge t/T increases, or as the expansion ratio (Vs) increases, the cornering stability drops. If the ratio b/W exceeds 0.65, or if the gauge ratio t/T exceeds 0.50, or if the expansion ratio (Vs) exceeds 50%, the cornering stability becomes poorer than the above Comparative Tire 2. Therefore, it is preferable that the ratio b/W is not more than 0.65, that the gauge ratio t/T is not more than 0.50, and that the expansion ratio (Vs) is not more than 50%. In Table 2, the 10% compression modulus means a value obtained by measuring compression stresses occurring when static compression forces were applied to a flat rubber plate having lengthwise and breadthwise lengths being both 40 mm and a thickness of 10 mm from upper and lower sides, and dividing a compression stress by a compression strain, the compression stress being a value when the thickness of the flat rubber plate

TABLE 1

|  | Comparative tire 1 | Test tire 1 | Test tire 2 | Test tire 3 | Test tire 4 | Test tire 5 | Test tire 6 | Test tire 7 |
| --- | --- | --- | --- | --- | --- | --- | --- | --- |
| Maximum gauge of tread rubber, T (mm) | 10.0 | 10.2 | 10.2 | 10.2 | 10.2 | 10.2 | 12.0 | 10.2 |
| Kind of cap rubber | non-foam rubber | non-foam rubber | non-foam rubber | non-foam rubber | non-foam rubber | non-foam rubber | non-foam rubber | non-foam rubber |
| Base rubber — Kind of rubber | non-foam rubber | foamed rubber | foamed rubber | foamed rubber | foamed rubber | foamed rubber | foamed rubber | foamed rubber |
| Maximum gauge, t (mm) | — | 1.8 | 1.8 | 1.8 | 1.8 | 4.0 | 5.8 | 5.8 |
| Expansion ratio (Vs) (%) | — | 15 | 30 | 45 | 60 | 30 | 30 | 30 |
| Gauge ratio t/T | — | 0.18 | 0.18 | 0.18 | 0.18 | 0.39 | 0.48 | 0.57 |
| Depth of main groove (mm) | 8.0 | 8.0 | 8.0 | 8.0 | 8.0 | 8.0 | 9.8 | 8.0 |
| Anti-vibration riding comfortability | 100 | 110 | 125 | 145 | 160 | 145 | 155 | 160 |
| Complete wear life ($\times 10^5$ km) | 7.6 | 7.7 | 7.6 | 7.4 | 6.5 | 7.4 | 7.2 | 6.8 |

Next, a second test example will be explained below.

is reduced by 10%.

TABLE 2

| | Comparative tire 2 | Comparative tire 3 | Test tire 8 | Test tire 9 | Test tire 10 | Test tire 11 | Test tire 12 | Test tire 13 | Test tire 14 |
|---|---|---|---|---|---|---|---|---|---|
| Maximum gauge of tread rubber, T (mm) | 10.2 | 10.2 | 10.2 | 10.2 | 10.2 | 10.2 | 10.2 | 10.2 | 10.2 |
| Cap rubber — Kind of rubber | non-foam rubber | non-foam rubber | non-foam rubber | non-foam rubber | non-foam rubber | non-foam rubber | non-foam rubber | non-foam rubber | non-foam rubber |
| Cap rubber — 10% compression modulus (kgf/mm$^2$) | 0.60 | 0.85 | 0.85 | 0.85 | 0.85 | 0.85 | 0.85 | 0.85 | 0.85 |
| Base rubber — Kind of rubber | non-foam rubber | non-foam rubber | foamed rubber | foamed rubber | foamed rubber | foamed rubber | foamed rubber | foamed rubber | foamed rubber |
| Base rubber — Expansion ratio (Vs) (%) | — | — | 30 | 30 | 30 | 30 | 30 | 15 | 60 |
| Base rubber — 10% compression modulus (kgf/mm$^2$) | 0.60 | 0.85 | 0.34 | 0.34 | 0.34 | 0.34 | 0.34 | 0.61 | 0.22 |
| Base rubber — Maximum gauge, t (mm) | — | — | 1.9 | 1.9 | 1.9 | 1.0 | 6.1 | 1.9 | 1.9 |
| Base rubber — Width b (mm) | — | — | 30 | 60 | 90 | 60 | 60 | 60 | 60 |
| Ratio b/W | — | — | 0.25 | 0.50 | 0.74 | 0.50 | 0.50 | 0.50 | 0.50 |
| Gauge ratio t/T | — | — | 0.19 | 0.19 | 0.19 | 0.10 | 0.60 | 0.19 | 0.19 |
| Anti-vibration riding comfortability | 100 | 80 | 105 | 120 | 130 | 110 | 135 | 105 | 140 |
| Cornering stability | 100 | 150 | 130 | 120 | 80 | 125 | 95 | 140 | 90 |

Figure 12:
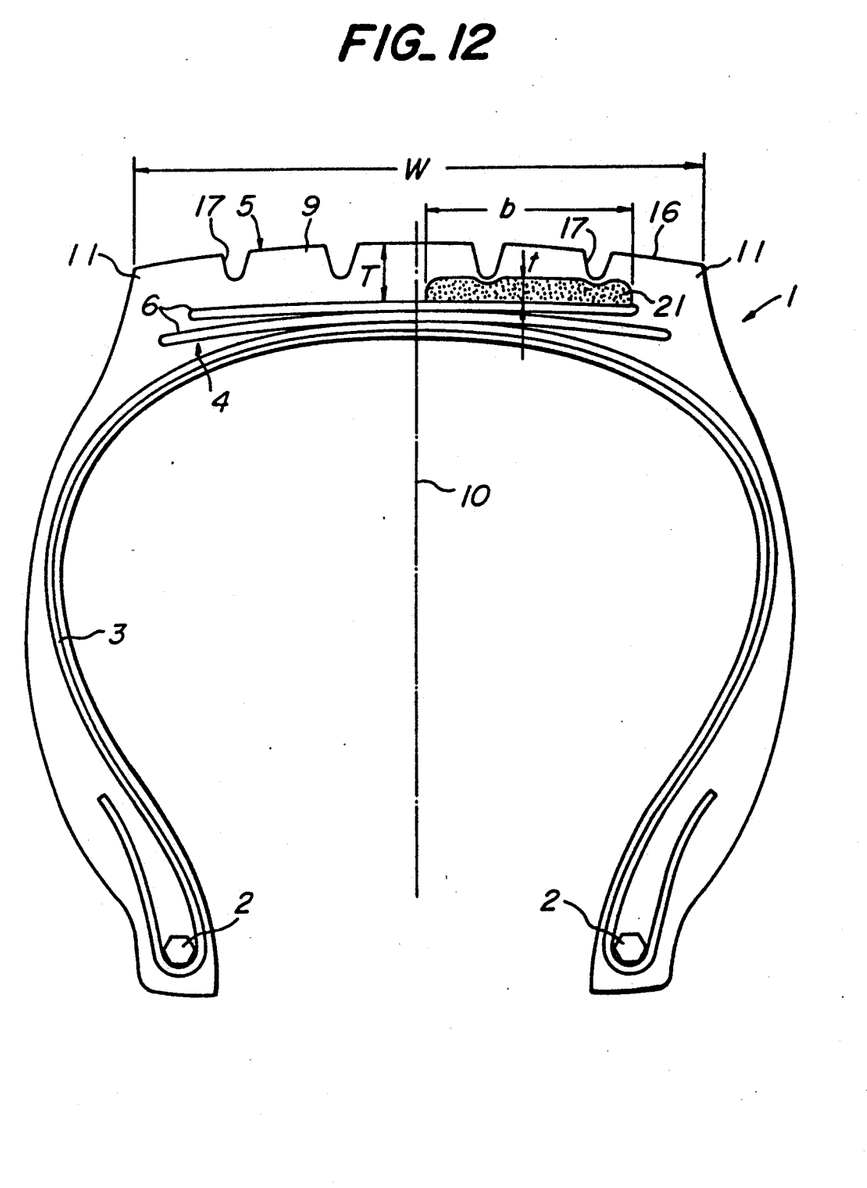
FIG. 12 is a sectional view of a second embodiment according to the present invention taken along a meridian line.

FIG. 12 is a sectional view of a second embodiment of the present invention. In this embodiment, the widthwise center of a base rubber 21 is spaced from the equatorial plane 10 of the tire such that the base rubber 21 is entirely arranged on one side of the equatorial plane 10. By so arranging, wear resistance and anti-vibration riding comfortability can both be attained in the pneumatic tire in which the fitting side is preliminarily determined. The other construction and function are the same as those in the first embodiment.

Figure 13:
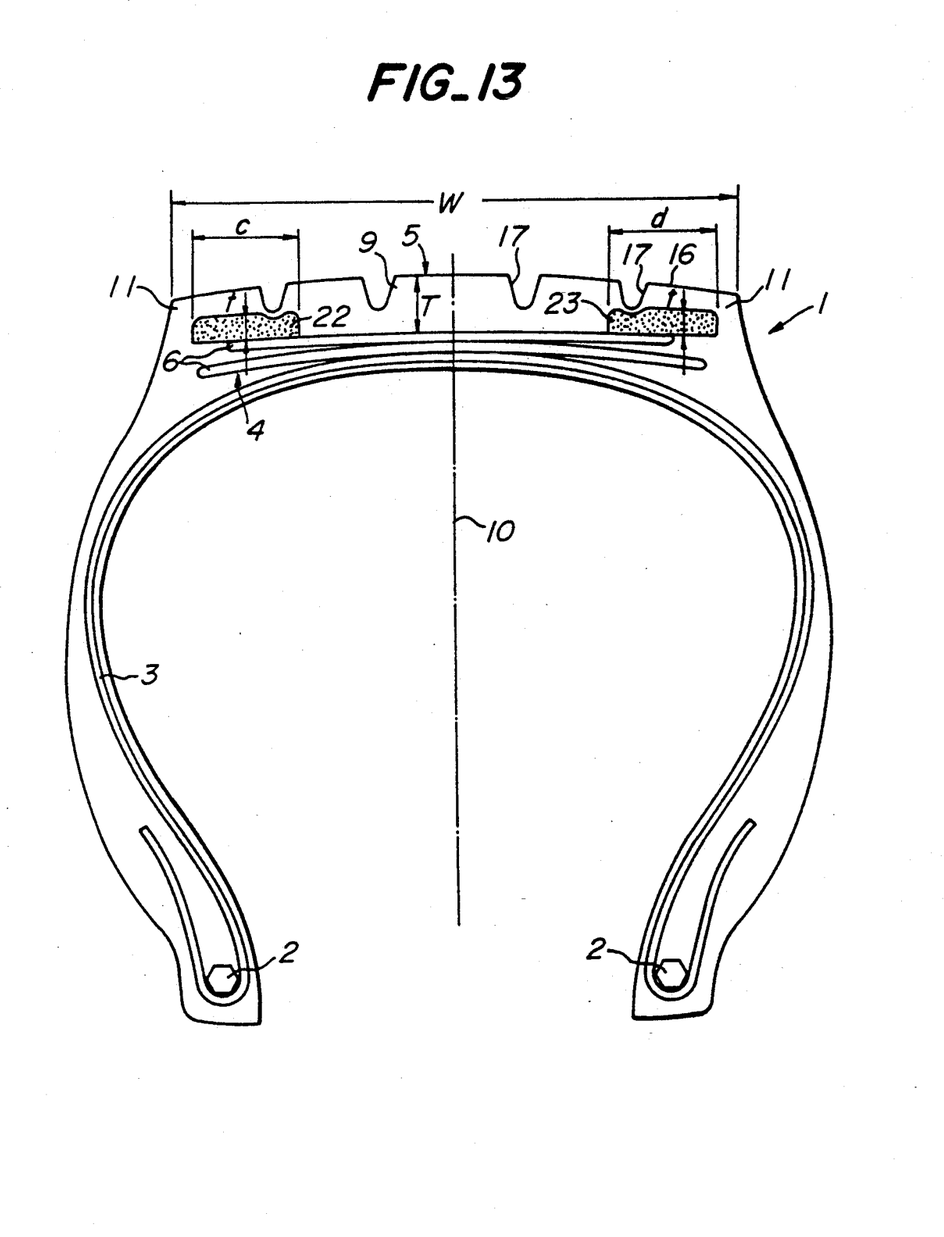
FIG. 13 is a sectional view of a third embodiment according to the present invention taken along a meridian line.

FIG. 13 is a sectional view of a third embodiment of the present invention. In this embodiment, narrow base rubbers 22 and 23 are provided on opposite sides of the tire equatorial plane 10, respectively, and a cap rubber 9 is arranged above and between the base rubbers 22 and 23. The total value of widths c and d of the base rubbers 22 and 23, respectively, is equal to the width b of the base rubber 8 in the first embodiment. By so constructing, an applied load in the ground contact area becomes near uniform, so that both the prevention of the occurrence of uneven wearing and improvement of the anti-vibration riding comfortability can be attained. The other construction and function are the same as in the first embodiment.

In the above-mentioned embodiments, most of the radially outer side surface of the base rubber is flat. However, according to the present invention, the radially outer surface of the base rubber may be corrugated. By so constructing, a rapid increase in the exposed area of the base rubber at the final wearing stage can be prevented.

As having been explained, according to the present invention, the anti-vibration riding comfortability can be improved to a large extent without deteriorating the wear resistance.

What is claimed is:

1. A pneumatic tire comprising; a toroidal carcass, a belt composed of at least two rubberized cord layers arranged radially outside the carcass, a tread surrounding the periphery of the belt having a tread rubber comprising a base rubber made of a foamed rubber, and a cap rubber made of a non-foam rubber, said foamed rubber having numerous closed cells, an expansion ratio in a range from 10 to 50%, and a 10% compression modulus in the range of 0.22 to 0.61 kgf/mm$^2$, said cap rubber being arranged radially outside the base rubber; wherein a widthwise center of the base rubber is in substantial conformity with an equatorial plane of the tire, a width of the base rubber is smaller than that of the belt, and the cap rubber is also arranged on opposite lateral sides of the base rubber, a ratio of b/W is in a range from 0.15 to 0.65, in which b and W are a width of the base rubber and a ground contact width of the tread when a normal internal pressure is applied to the tire fitted to a normal rim under application of a normal load, respectively, and a ratio of t/T is in a range from 0.05 to 0.50, in which t and T are maximum gauges of the base rubber and the tread rubber, respectively.

* * * * *